United States Patent
Takeda

(10) Patent No.: US 9,455,789 B2
(45) Date of Patent: Sep. 27, 2016

(54) OPTICAL RECEPTION APPARATUS, AND CONTROL APPARATUS AND CONTROL METHOD OF OPTICAL RECEPTION APPARATUS

(71) Applicant: Fujitsu Optical Components Limited, Kawasaki-shi, Kanagawa (JP)

(72) Inventor: Hidekazu Takeda, Shinagawa (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/620,497

(22) Filed: Feb. 12, 2015

(65) Prior Publication Data
US 2015/0229411 A1     Aug. 13, 2015

(30) Foreign Application Priority Data

Feb. 13, 2014  (JP) ................. 2014-025429

(51) Int. Cl.
*H04B 10/06* (2006.01)
*H04B 10/67* (2013.01)
*H04B 10/00* (2013.01)

(52) U.S. Cl.
CPC ............ *H04B 10/674* (2013.01); *H04B 10/00* (2013.01)

(58) Field of Classification Search
CPC .... H04B 10/674; H04B 10/60; H04B 10/40; H04B 10/671; H04B 10/672; H04B 10/66; H04B 10/69; H04B 10/691; H04B 10/695
USPC ....... 398/202, 208, 209, 210, 33, 38, 25, 27, 398/213, 214, 135, 136, 137, 138, 34, 37, 398/207, 162, 158, 159, 79
See application file for complete search history.

(56) References Cited

U.S. PATENT DOCUMENTS

| | | | |
|---|---|---|---|
| 6,744,964 B1* | 6/2004 | Vittal ............... | H04B 10/25073 385/140 |
| 7,684,698 B2* | 3/2010 | Stuart ................. | H04B 10/077 398/202 |
| 2004/0062557 A1* | 4/2004 | Takashima ........... | H04B 10/674 398/209 |
| 2010/0142958 A1 | 6/2010 | Matsumoto | |

FOREIGN PATENT DOCUMENTS

| | | |
|---|---|---|
| JP | 4-207644 | 7/1992 |
| JP | 2010-136195 | 6/2010 |

\* cited by examiner

*Primary Examiner* — Hanh Phan
(74) *Attorney, Agent, or Firm* — Staas & Halsey LLP

(57) ABSTRACT

An optical reception apparatus may include a variable optical attenuator, a detector, and a controller. The variable optical attenuator may adjust a loss of an output optical power of a received light. The detector may detect that the output optical power is equal to or lower than a first level. The first level may be used to determine whether the output optical power is in a light interruption state. The controller may increase, in response to the detection made by the detector, the loss of the variable optical attenuator to a loss according to a second level. The second level may be used to determine whether the light interruption state is recovered.

7 Claims, 13 Drawing Sheets

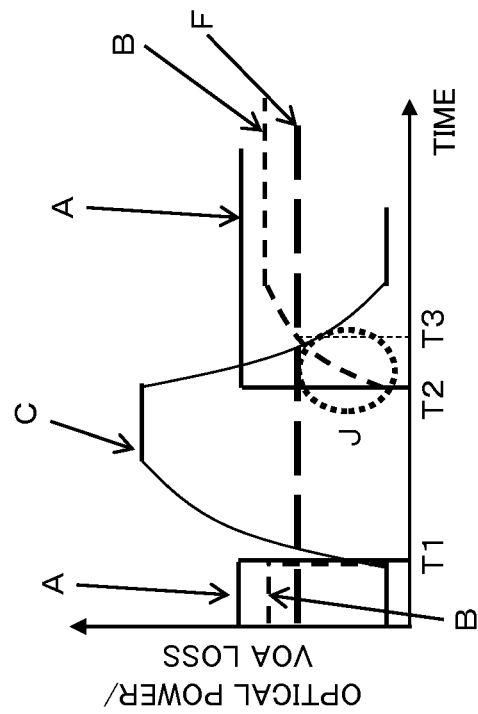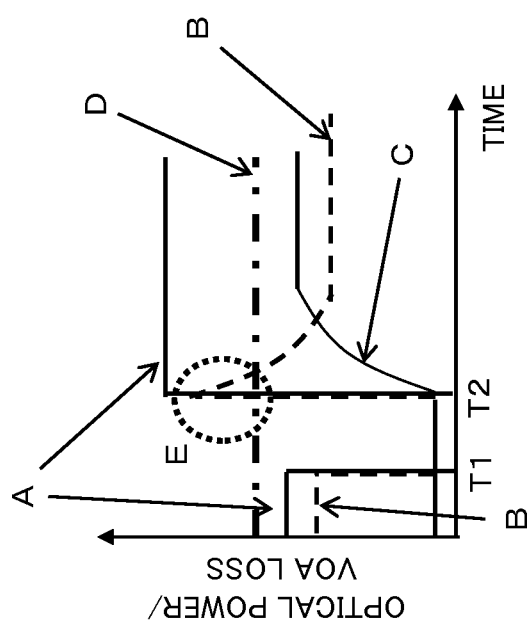
FIG. 6A
FIG. 6B

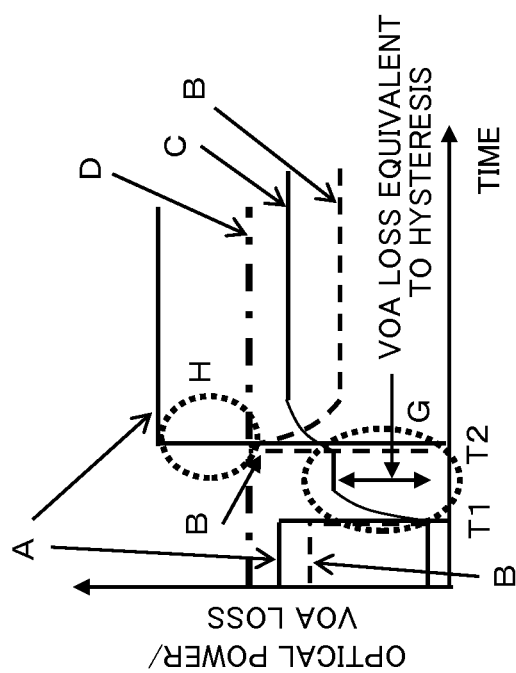
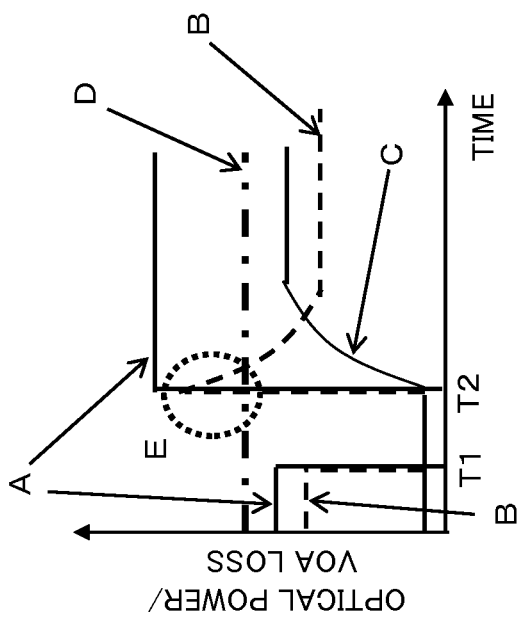

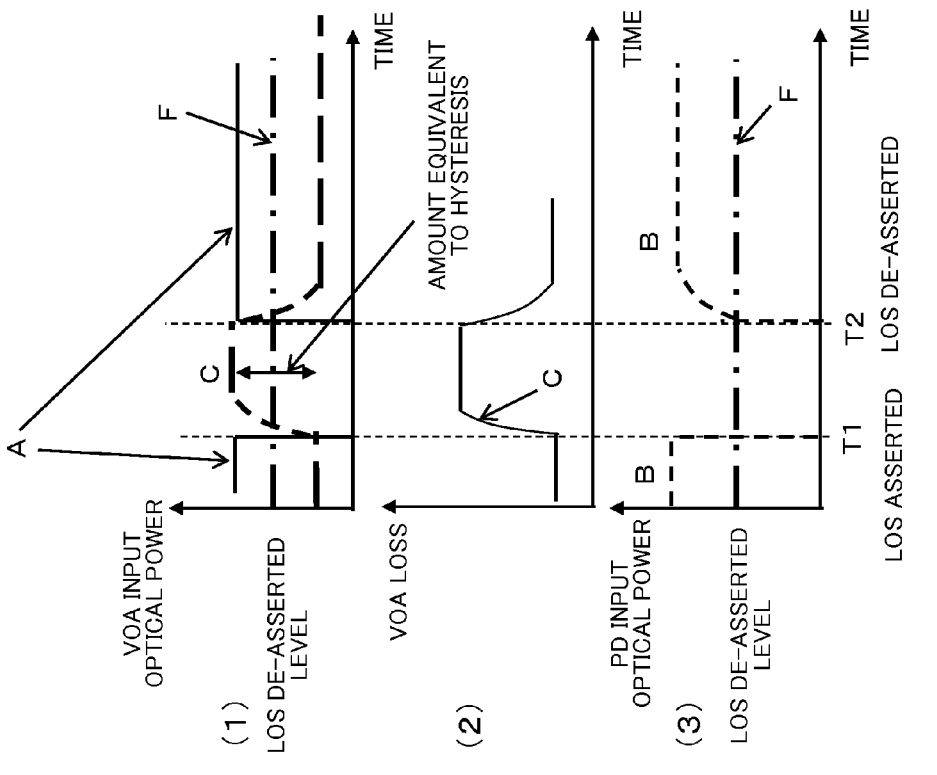
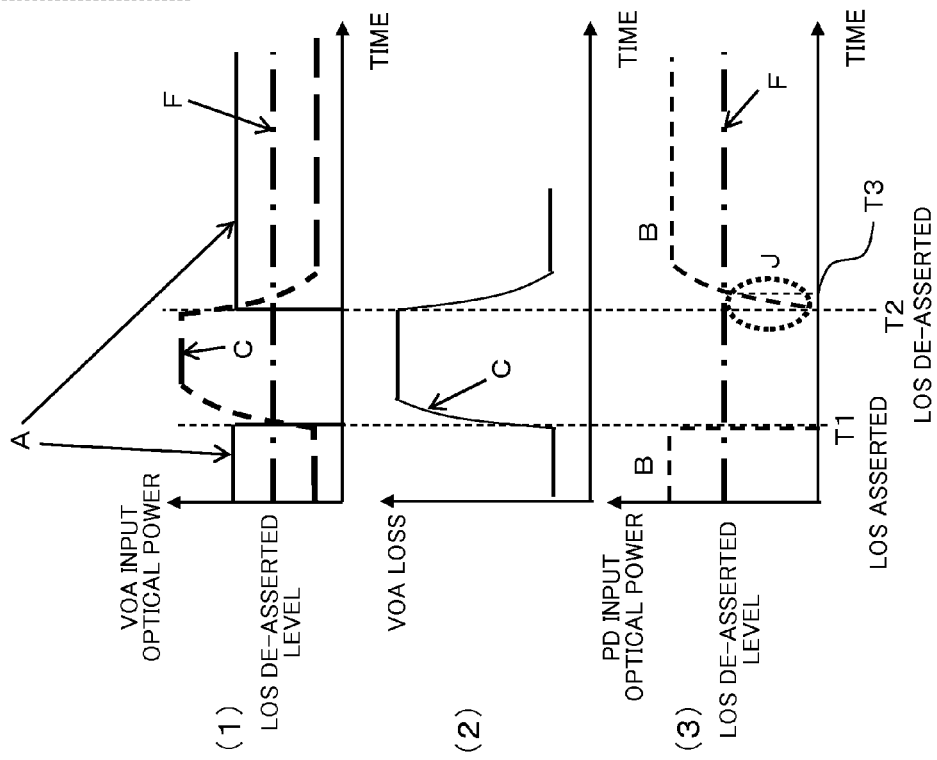

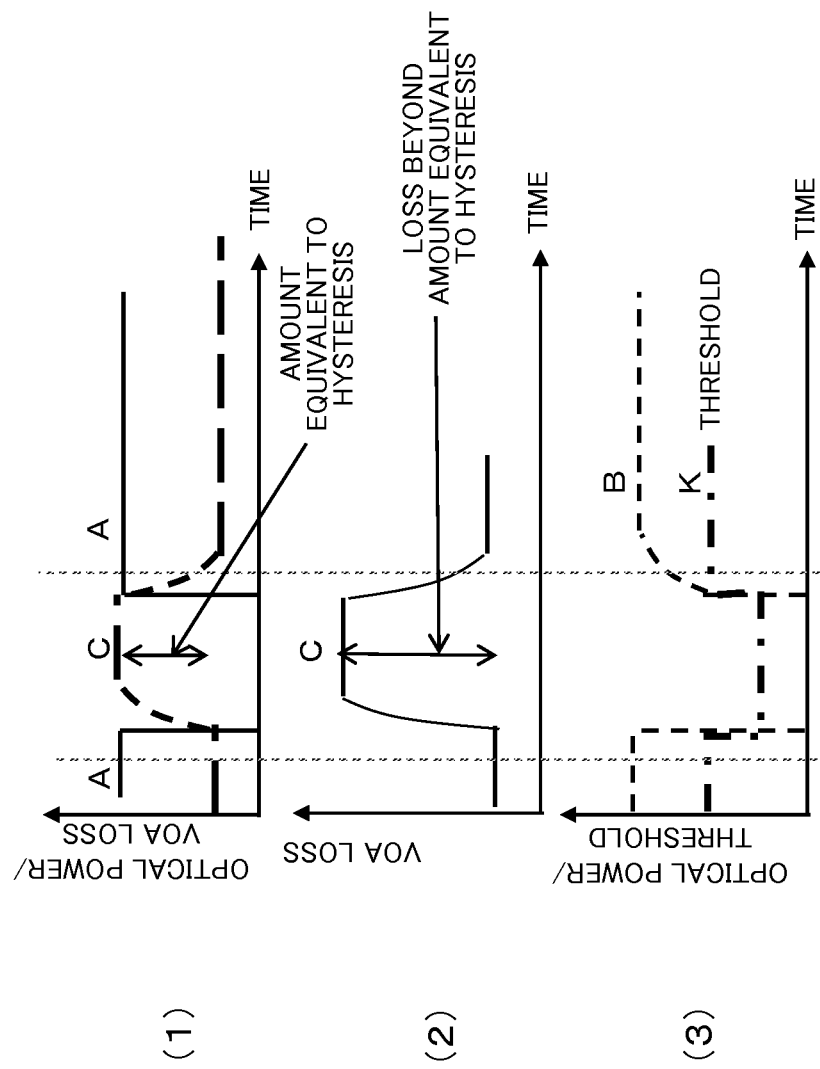

OPTICAL RECEPTION APPARATUS, AND CONTROL APPARATUS AND CONTROL METHOD OF OPTICAL RECEPTION APPARATUS

CROSS-REFERENCE TO RELATED APPLICATION

This application is based upon and claims the benefit of priority of the prior Japanese Patent Application No. 2014-025429, filed on Feb. 13, 2014, the entire contents of which are incorporated herein by reference.

FIELD

The embodiment discussed herein is related to an optical reception apparatus, and a control apparatus and a control method of the optical reception apparatus.

BACKGROUND

In recent years, as a demand for the Internet is explosively increased, an experiment to speed up communications has been made in an access network such as a "fiber to the home" (FTTH) or a backbone (or core) network). In one of next-generation networks, an optical transceiver used in an Ethernet such as a 40 G (gigabits)-Ethernet or a 100 G-Ethernet is actively developed. The "Ethernet" is a registered trademark.

In an optical receiver used in the optical transceiver, for example, a variable optical attenuator (VOA) may be used in order to prevent a light receiving element or an optical component such as a photodiode (PD) from being broken down due to an input optical power beyond a rated value. For example, the breakdown of the optical component such as the light receiving element can be prevented by feedback-controlling a loss amount (hereinafter, may be referred to as a "VOA loss") of the VOA such that a current value according to the reception power of the PD does not exceed the rated value.

JP 4-207644 A and JP 2010-136195 A disclose a technology relating to an optical receiver.

JP 4-207644 A discloses a technology in which two VOAs having different VOA losses are provided at the front stage of the light receiving element and the optical power input to the light receiving element is controlled by switching these VOAs. In addition, JP 4-207644 A discloses a technology in which a comparator is provided to compare a current value according to the reception optical power of the light receiving element with a predetermined threshold and a hysteresis characteristic is set to the comparator to give the hysteresis characteristic to a switching of the VOA losses.

Meanwhile, JP 2010-136195 A discloses an optical receiver provided with a semiconductor optical amplifier (SOA). In the optical receiver disclosed in JP 2010-136195 A, a wavelength multiplex optical signal amplified by the SOA is separated (or demultiplexed) for each wavelength (or channel), an electrical signal (or strength) according to the optical power of each of the demultiplexed optical signals is detected, and a bias current of the SOA (or a gain of the SOA) is controlled according to the detection result.

The VOA used in the optical receiver may be controlled so that the VOA loss is minimized in a no-signal state (may be referred to as a light interruption state) that is a state where the optical signal is not input because the reception power of the optical receiver used for the VOA control is low. Upon increasing an input optical power to the optical receiver steeply due to a recover of the light interruption state, the VOA loss is controlled to be increased in order to prevent the breakdown of the light receiving element.

However, since a response of the control of the VOA is slow, optical overshoot, optical surges and the like would be occurred. They would cause the light receiving element to receive a signal having a power beyond the rated value. Thus a current beyond the rated value would flow in the light receiving element. Therefore, the light receiving element would be damaged. In the worst case, the light receiving element may be broken down.

In view of this, by preliminarily controlling the VOA loss to be, for example, a maximum value in the no-signal state or in a state determined substantially having no signal, it is possible to prevent a current beyond the rated value from flowing into the light receiving element even when the input optical power to the optical receiver is steeply increased. The no-signal state or the state determined substantially having no signal may be considered as, for example, a state where a current value according to the input optical power to the light receiving element is equal to or lower than a predetermined threshold. In this state, an alarm called a LOS (Loss Of Signal) alarm is asserted to indicate a loss of the optical signal. A current threshold to assert the LOS alarm may be called a LOS asserted threshold or a LOS asserted level.

However, when the VOA loss is preliminarily controlled to the maximum value as described above, it would occur a delay in time taken until the current value of the light receiving element exceeds the LOS asserted level and the input optical power reaches a level (hereinafter, referred to as a "LOS cancellation level") at which the asserted LOS alarm is cancelled. For example, since a control response time of the VOA is taken in several microseconds (ms) order, there occurs a delay in time (hereinafter, referred to as a "LOS cancellation time") taken until the LOS alarm is cancelled according to the order.

In this case, a LOS cancellation time less than 100 μs defined in a CFP (100 G Form-factor Pluggable) standard may be unsatisfied. In JP 4-207644 A and JP 2010-136195 A, there is no mention on a relation between breakdown prevention for the light receiving element and the LOS cancellation time.

SUMMARY

An aspect of an optical reception apparatus may include a variable optical attenuator, a detector, and a controller. The variable optical attenuator may adjust a loss of an output optical power of a received light. The detector may detect that the output optical power is equal to or lower than a first level. The first level may be used to determine whether the output optical power is in a light interruption state. The controller may increase the loss of the variable optical attenuator to a first loss according to a second level, upon detecting by the detector that the output optical power is equal to or lower than the first level The second level may be used to determine whether the light interruption state is recovered.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 6A and 6B are diagrams each illustrating an example of temporal changes in an input optical power to the VOA, an input optical power to the PD, and a VOA loss;

FIGS. 7A and 7B are diagrams each illustrating an example of temporal changes in the input optical power to the VOA, the input optical power to the PD, and the VOA loss;

FIGS. 8A and 8B are diagrams each illustrating an example of temporal changes in the input optical power to the VOA, the input optical power to the PD, and the VOA loss;

FIG. 13 is a diagram for describing control of lowering the threshold voltage in a case where a VOA loss equivalent to hysteresis is set to the VOA.

DESCRIPTION OF EMBODIMENT(S)

Figure 1:
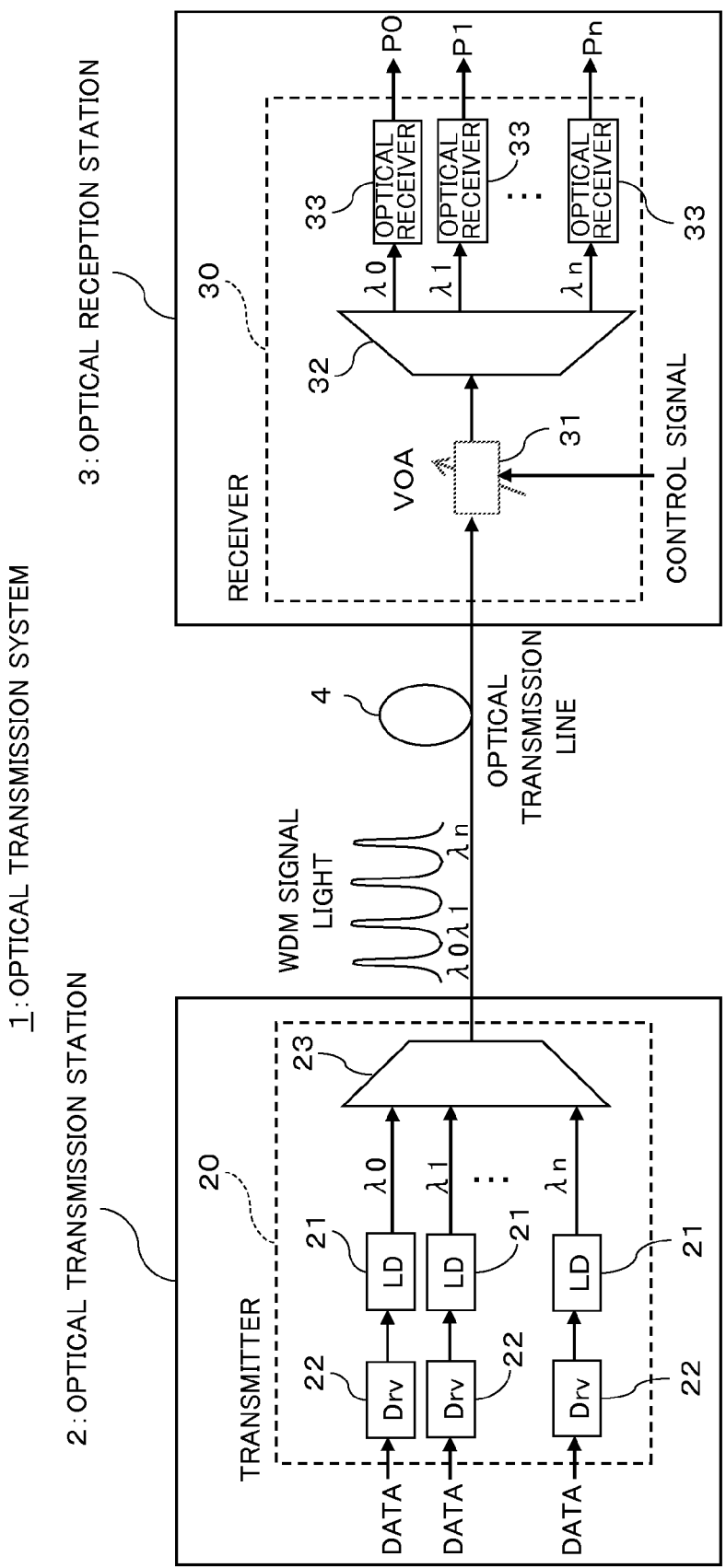
FIG. 1 is a block diagram illustrating an example of an optical transmission system according to an embodiment.

Hereinafter, embodiment(s) of the invention will be described with reference to the drawings. The following embodiment(s) is given as merely exemplary, and it is not intended to exclude various modifications and various technical applications which are not specified in the embodiment(s). In the drawings used in the following embodiment(s), the components assigned by the same symbols represent the same or similar components unless otherwise stated.

FIG. 1 is a block diagram illustrating an example of an optical transmission system 1 according to an embodiment. The optical transmission system 1 illustrated in FIG. 1 may include, for example, an optical transmission station 2 and an optical reception station 3 that is connected to the optical transmission station 2 through an optical transmission line 4 using an optical fiber or the like. Both of the optical transmission station 2 and the optical reception station 3 are an example of an optical transmission apparatus.

The optical transmission station 2 may include, for example, an optical communication module. With focusing on a transmitter 20 of the optical communication module, the transmitter 20 may include a plurality of light sources 21, a plurality of drivers 22 which apply driving signals to the respective light sources 21, and a wavelength multiplexer 23 which combines (or wavelength-multiplexes) the output lights of the light sources 21.

The respective light sources 21 may be provided in correspondence with a plurality of wavelengths $\lambda 0$ to $\lambda n$ (n is an integer of 2 or more). An example of the light source 21 is a laser diode (LD) which has an oscillation wavelength corresponding to any one or more of the wavelengths $\lambda 0$ to $\lambda n$.

The driver 22 may control, for example, an emitting state of the light source 21 by controlling a driving current of the light source 21 according to a data signal to be transmitted. Thereby, the light source 21 is available to output a signal light modulated by the data signal. This modulation scheme is a so-called direct modulation scheme. However, an external modulation scheme is applicable to the present embodiment.

The wavelength multiplexer 23 performs a wavelength multiplexing (WDM) on transmission modulated signal lights having the plurality of wavelengths $\lambda 0$ to $\lambda n$ output from the respective light sources 21 to output the multiplexed light to the optical transmission line 4. A multiplexing coupler is applicable to the wavelength multiplexer 23, for example.

Meanwhile, the optical reception station 3 may include, for example, an optical communication module. With focusing on a receiver 30 of the optical communication module, the receiver 30 may include a variable optical attenuator (VOA) 31, a wavelength demultiplexer 32, and a plurality of optical receivers 33 corresponding to the plurality of wavelengths $\lambda 0$ to $\lambda n$. The receiver 30 is an example of an optical reception apparatus.

The VOA 31 is available to adjust the power of the WDM signal light received from the optical transmission line 4 and to output the power-adjusted signal light to the wavelength demultiplexer 32. The VOA 31 may be controlled its loss (a VOA loss) by a controller (not illustrated in FIG. 1). The VOA loss may be controlled such that an input optical power supplied to each of the optical receivers 33 does not exceed an upper limit (a maximum reception level) of an available range of the optical receiver 33.

Figure 2:
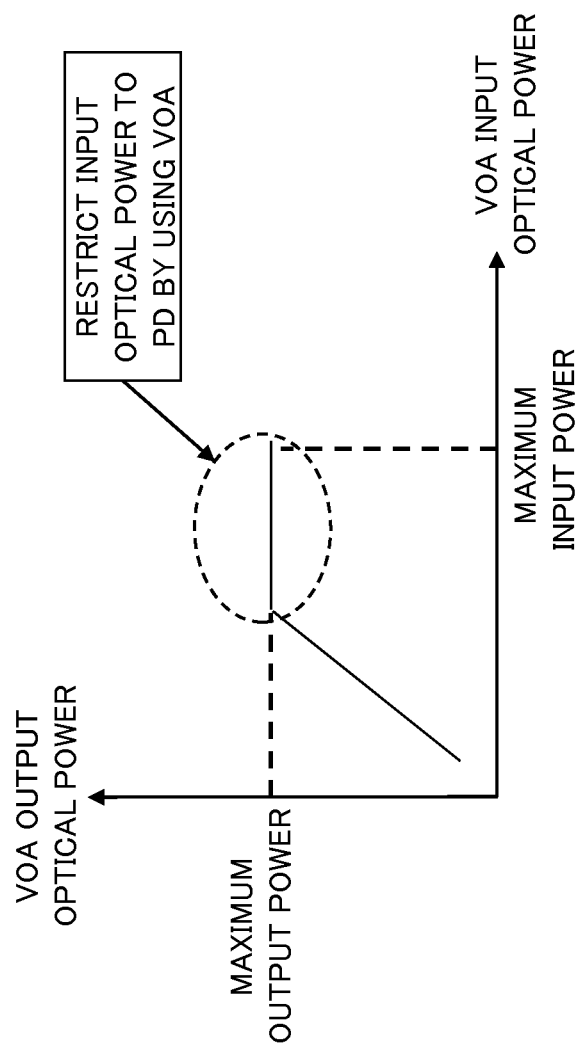
FIG. 2 is a diagram for describing that an input optical power to a PD is limited using a variable optical attenuator (VOA) in the optical transmission system illustrated in FIG. 1.

For example, the controller may monitor the input optical power supplied to the VOA 31 and feedback-control the VOA loss based on the monitoring result such that the input optical power per one optical receiver 33 does not exceed the maximum reception level. Thereby, as illustrated in FIG. 2, even when a power beyond the maximum reception level (for example, 4.5 dBm) of the optical receiver 33 is input to the VOA 31, the input optical power per one optical receiver 33 can be limited by the VOA loss to a constant level equal to or lower than a predetermined value (for example, 0 dBm).

Returning to FIG. 1, the wavelength demultiplexer 32 is available to divide (or demultiplex) the WDM signal light input from the VOA 31 into optical signals for each wavelength and to output the demultiplexed optical signals to the corresponding optical receivers 33. A demultiplexing coupler is applicable to the wavelength demultiplexer 32, for example. An optical route for each optical wavelength through which the optical signal passes from the wavelength demultiplexer 32 via the optical receiver 33 may be referred to as a "lane".

Each of the optical receivers 33 is available to generate an electrical signal (any one of P0 to Pn) according to the reception power of the output light from the wavelength demultiplexer 32. The optical receiver 33 may include, for example, a photo diode (or a photo detector) (PD) as an example of a light receiving element. The PD outputs a current according to the reception power. The optical receiver 33 may be provided with a transimpedance amplifier (TIA) available to convert the output current of the PD into a voltage. A block containing the wavelength demultiplexer 32, the PD, and the TIA may be referred to as a receiver optical subassembly (ROSA).

Figure 3:
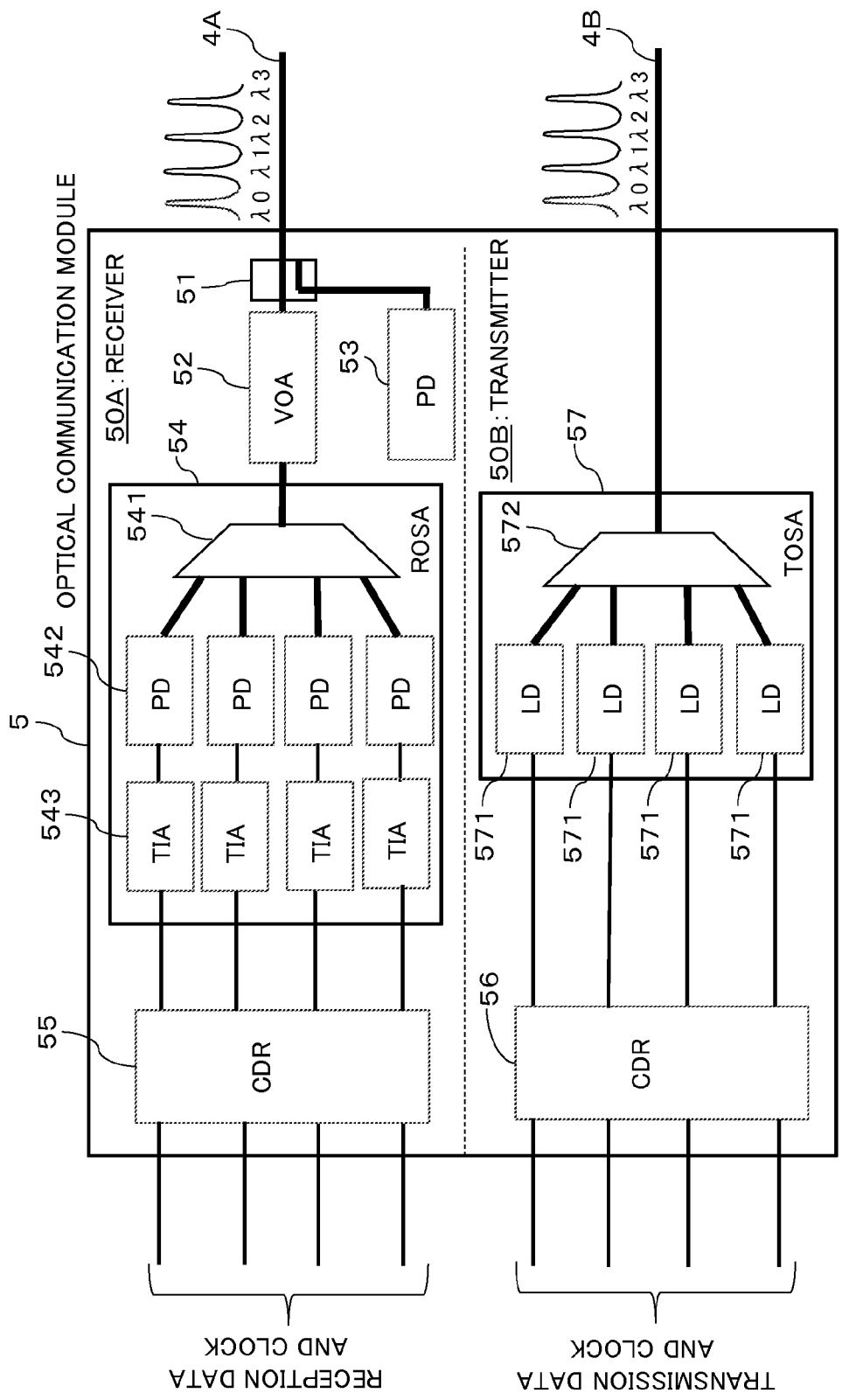
FIG. 3 is a block diagram illustrating an exemplary configuration of an optical communication module provided to an optical transmission station or an optical reception station illustrated in FIG. 1.

Next, FIG. 3 illustrates an exemplary configuration of an optical communication module 5 provided to the optical transmission station 2 or the optical reception station 3 that is an example of the optical transmission apparatus as described above.

The optical communication module 5 illustrated in FIG. 3 is an example of a module compliant to the CFP2 standard and supports a bidirectional WDM optical communication with 4 wavelengths ($\lambda 0$ to $\lambda 3$). Upon focusing on a receiver 50A, the optical communication module 5 may include an optical split coupler 51, a VOA 52, a light receiving element 53, a ROSA 54, and a clock data recovery (CDR) circuit 55. The receiver 50A may be considered as corresponding to the receiver 30 illustrated in FIG. 1.

The optical split coupler 51 is available to split a part of the WDM signal light input to the VOA 52 from an optical transmission line 4A such as an optical fiber and to output the split light as a monitor light to the light receiving element 53.

The light receiving element 53 may be a PD, for example, and is available to generate an electrical signal according to the reception power of the monitor light input from the optical split coupler 51. The electrical signal is output to the controller (not illustrated in FIG. 3) and is used for the above-mentioned VOA loss control performed by the controller. The light receiving element 53 will be referred to as a "monitor PD 53" below.

The VOA 52 may be considered as corresponding to the VOA 31 illustrated in FIG. 1 and is available to control (or adjust) the input optical power to the ROSA 54 by the VOA loss control.

The ROSA 54 may include a wavelength demultiplexer 541, and PDs 542 and TIAs 543 provided for the respective wavelengths $\lambda 0$ to $\lambda n$.

The wavelength demultiplexer 541 may be considered as corresponding to the wavelength demultiplexer 32 illustrated in FIG. 1, and the PD 542 and the TIA 543 may be considered as corresponding to the optical receiver 33 illustrated in FIG. 1. The functions of the PD 542 and the TIA 543 may be the same as described above.

The CDR circuit 55 is available to recover (or restore) a clock signal and a data signal based on the electrical signal output from the TIA 543 for each wavelength of the ROSA 54. the CDR circuit 55 may include an alarm (LOS) function. The LOS function is available to assert and cancel an alarm signal for each lane.

Figure 4:
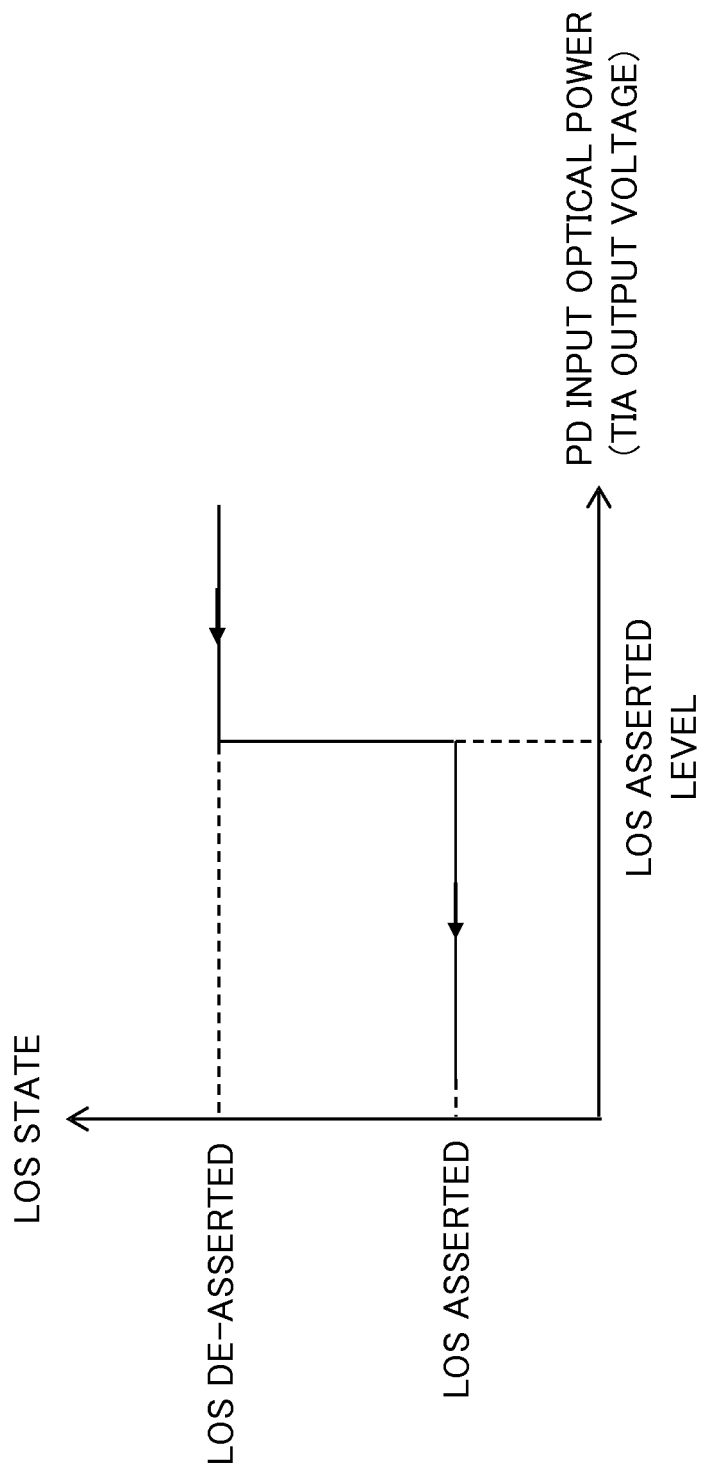
FIG. 4 is a diagram for describing a LOS state according to the input optical power to the PD.

For example, when the electrical signal (for example, a voltage value) output from any of the TIAs 543 of the ROSA 54 becomes less than a lower limit value in a predetermined reception range, the electrical signal does not satisfy a minimum reception sensitivity of the ROSA 54. Thus, the LOS function outputs the alarm signal indicative of a loss of the optical signal. An example of the alarm signal is a LOS alarm. Therefore, the lower limit value may be referred to as a LOS asserted level. The LOS asserted level is an example of a first level. For example, as illustrated in FIG. 4, when the input optical power to the PD 542 is lowered in a state where the LOS alarm is de-asserted and when an output voltage value of the TIA 543 becomes equal to or lower than the LOS asserted level, the LOS alarm is asserted.

The LOS alarm may be cancelled when the output voltage value of the TIA 543 in the corresponding lane becomes equal to or higher than the LOS asserted level. However, the output voltage value of the TIA 543 may be fluctuated in a vicinity of the LOS asserted level due to the influence of noises or the like. In this case, the assertion and cancellation of the LOS alarm may be repeated frequently.

Figure 5:
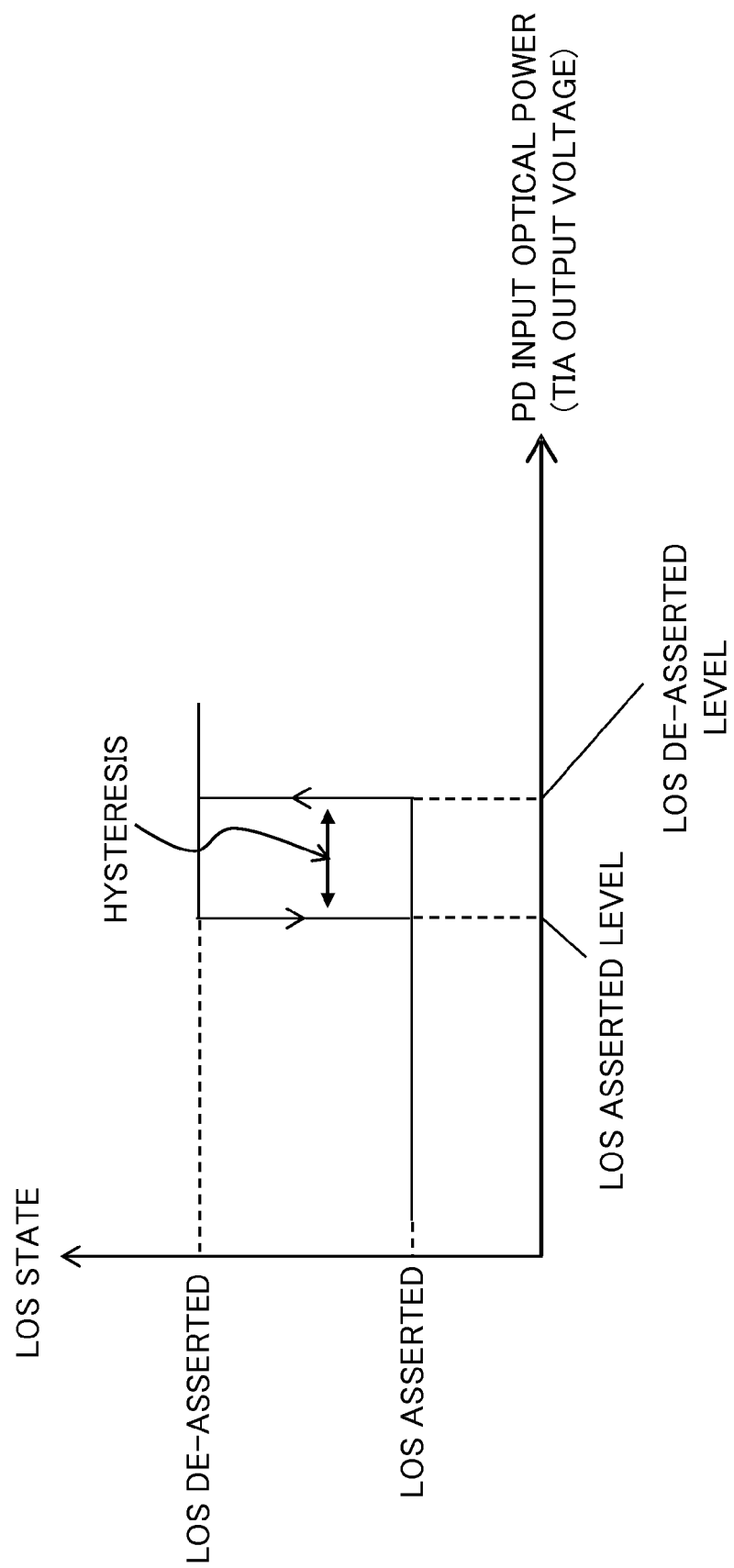
FIG. 5 is a diagram for describing a hysteresis provided to a LOS asserted level and a LOS cancellation level.

Therefore, as illustrated in FIG. 5, a LOS cancellation level may be set to a level higher than the LOS asserted level but lower than a maximum output level of the TIA 543. In other words, hysteresis may be given to the LOS asserted level and the LOS cancellation level. The LOS cancellation level is an example of a second level. The LOS alarm is cancelled (or disabled) when the output voltage value of the TIA 543 becomes equal to or higher than the LOS cancellation level.

Returning to FIG. 3, the optical communication module 5, with focusing on a transmitter 50B, may include a CDR circuit 56 and a transmitter optical subassembly (TOSA) 57. The TOSA 57 may include, for example, LDs 571 which are an example of the light sources having the wavelengths $\lambda 0$ to $\lambda n$, and a wavelength multiplexer 572. The transmitter 50B may be considered as corresponding to the transmitter 20 illustrated in FIG. 1.

The CDR circuit 56 receives transmission data and a clock for each of the wavelengths $\lambda 0$ to $\lambda 3$ to generate driving signals of the LDs 571 according to the transmission data.

Each of the LDs 571 is controlled its emitting state according to the driving signal given from the CDR circuit 56 to output the transmission modulation signal light of the corresponding wavelength.

The wavelength multiplexer 572 is available to wavelength-multiplexes (or combines) the transmission modulation signal lights input from the respective LDs 571 and to output the multiplexed light to an optical transmission line 4B such as an optical fiber.

The LD 571 and the wavelength multiplexer 572 may be considered as corresponding to the LD 21 and the wavelength multiplexer 23 illustrated in FIG. 1, respectively. The driver 22 illustrated in FIG. 1 is not illustrated in FIG. 3.

Next, the consideration will be made about the control of the VOA loss in a case where the input optical power to the receiver 50A is steeply increased. The steep increase may be occurred in a recovery of an input light to the receiver 50A (or the VOA 52) of the optical communication module 5 configured as described above recovered from receiving no input light (that is a light interruption state).

Each of FIGS. 6A and 6B is diagram illustrating an example of temporal changes in the input optical power to the VOA 52, the input optical power to the PD 542, and the VOA loss. In each of FIGS. 6A and 6B, the rectangular solid line A depicts a change in the input optical power to the optical communication module 5 (or the VOA 52), the dotted line B depicts a change in the input optical power to the PD 542, and the solid line C depicts a change in the VOA loss.

Further, the input optical power (or level) depicted by the chain line D depicts a threshold indicative of a power level possibly giving a damage to the PD 542 when a light having a power beyond this power level is input to the PD 542. The threshold may be referred to as a "maximum (or rated) reception level" of the PD 542, or may be referred to as a "damage level". Further, each of FIGS. 6A and 6B illustrates a case where the light interruption state is occurred at the time T1, and then the input light to the VOA 52 is recovered at the time T2. The "light interruption state" may include a state where the light with a level equal to or lower than the LOS asserted level not satisfying the minimum reception sensitivity of the ROSA 54 is input to the ROSA 54 as well as a state where the light input to the ROSA 54 is interrupted completely.

As illustrated in FIG. 6A, in the light interruption state at the time T1, it is assumed that the VOA loss is controlled at a minimum level to wait for the recovering of the input light in order to satisfy the minimum reception sensitivity of the ROSA 54. In this case, when the input light is recovered at the time T2, the control begins to increase the VOA loss toward the maximum value (see the solid line C) so that the input optical power to the PD 542 does not exceed the damage level.

However, since a control response time of the VOA 52 is taken for a millimeter (ms) order as described above, the loss of the input optical power is not sufficient yet and the input optical power beyond the damage level is input to the PD 542 as depicted by the dotted line frame E in FIG. 6A. In other words, an optical overshoot due to an optical surge occurs.

In order to prevent such optical overshoot at the time when the input light is recovered, as illustrated in FIG. 6B, it may be considered that the VOA loss is controlled to be a maximum value in the light interruption state at the time T1. Then, the VOA loss is controlled to be decreased from the maximum value at the time when the input light is recovered (time T2). In this case, although the optical overshoot can be prevented, there occurs a delay in a period of time until the input optical power to the PD 542 reaches the LOS cancellation level (see the dotted line F) after the time T2 according to the control response time of the VOA 52.

For example, in FIG. 6B, the input optical power to the PD 542 is increased at a response speed according to the control response time of the VOA 52 (see the dotted line frame J), the input optical power to the PD 542 reaches the LOS cancellation level at the time T3. Therefore, a cancellation timing point of the LOS alarm is delayed by a period of time T2-T3. When the delay becomes 100 μs or more, the LOS cancellation time (less than 100 μs) defined in the CFP standard is not satisfied.

Therefore, in the present embodiment, the VOA loss is controlled to be increased to a loss according to the LOS cancellation level when the light interruption state occurs. For example, the VOA loss may be a loss falling within a range in which the input optical power to the PD 542 is less than the damage level at the time when the input light is recovered and is available to reaches the LOS cancellation level within the LOS cancellation time defined in the CFP standard.

A non-limiting example of such a VOA loss is a loss corresponding to a difference between the LOS asserted level and the LOS cancellation level (in other words, hysteresis described above). For example, it is assumed that the maximum value of the input optical power at the time of recovering the input light to the optical communication module 5 (or the VOA 52) is 4.5 dBm and that the hysteresis is set to 5 dB. In this case, when the light interruption state is detected (or LOS asserted), the VOA loss may be set (controlled to be increased) to 5 dB that is equivalent to the hysteresis.

According to such VOA loss setting (or control) described above, it is possible to suppress the delay in the LOS cancellation time while limiting the input optical power to the PD 542 below the damage level (for example, 0 dBm) at the time when the light input is recovered. In other words, it is possible to reduce the LOS cancellation time.

For example, since the input optical power to the PD 542 promptly reaches the LOS cancellation level without waiting for the control response of the VOA 52 at the time when the light input is recovered, it is possible to cancel the asserted LOS alarm within the LOS cancellation time defined by the CFP standard. Therefore, it is possible to achieve compatibility between the damage protection of the PD 542 at the time when the light input is recovered and the LOS alarm cancellation within the LOS cancellation time defined by the CFP standard.

FIG. 7B illustrates an example of the temporal changes in the input optical power to the VOA 52, the input optical power to the PD 542, and the VOA loss in a case where the VOA loss setting described above is applied. FIG. 7A is a diagram for the sake of comparison with FIG. 7B and is the same as FIG. 6A. In other words, FIG. 7A illustrates a case where the VOA loss is controlled at a minimum level after detecting the light interruption state to wait for the recovering of the input light.

Similarly to FIGS. 6A and 7A, in FIG. 7B, the rectangular solid line A depicts the change in the input optical power to the optical communication module 5 (or the VOA 52), the dotted line B depicts the change in the input optical power to the PD 542, and the solid line C depicts the change in the VOA loss.

As illustrated in FIG. 7B, when the light interruption state is detected at the time T1, the VOA loss is controlled to be increased to a loss equivalent to hysteresis (see the dotted line frame G). Thereafter, even though the light input is recovered at the time T2 and a maximum input optical power (see the solid line A) is input to the VOA 52, for example, the input optical power to the PD 542 (see the dotted line B) is limited below the damage level (see the chain line D) by the VOA loss (see the dotted line frame H).

Further, as illustrated in (3) of FIG. 8B, since the input optical power to the PD 542 reaches the LOS cancellation level at the time when the light input is recovered (at the time T2), the LOS alarm is cancelled with no delay or the minimum delay. In other words, the delay in the cancellation timing point of the LOS alarm (see time T3) as illustrated in (3) of FIG. 8A and FIG. 6B does not occur, or can be minimized.

FIG. 8B is a diagram illustrating an example of the temporal changes in the input optical power to the VOA 52, the input optical power to the PD 542, and the VOA loss in a case where the VOA loss setting of the present embodiment is applied. FIG. 8B corresponds to a diagram illustrating an example of the temporal changes illustrated in FIG. 7B by dividing into (1) the temporal changes in the input optical power to the VOA 52 and the VOA loss, (2) the temporal change in the VOA loss, and (3) the temporal change in the input optical power to the PD 542.

In contrast, FIG. 8A corresponds to a diagram illustrating an example of the temporal changes in a case where the VOA loss is controlled to be a maximum value after the detection of the light interruption state to wait for the recovering of the light input illustrated in FIG. 6B by dividing into three items (1) to (3) similarly to (1) to (3) of FIG. 8B.

Figure 9:
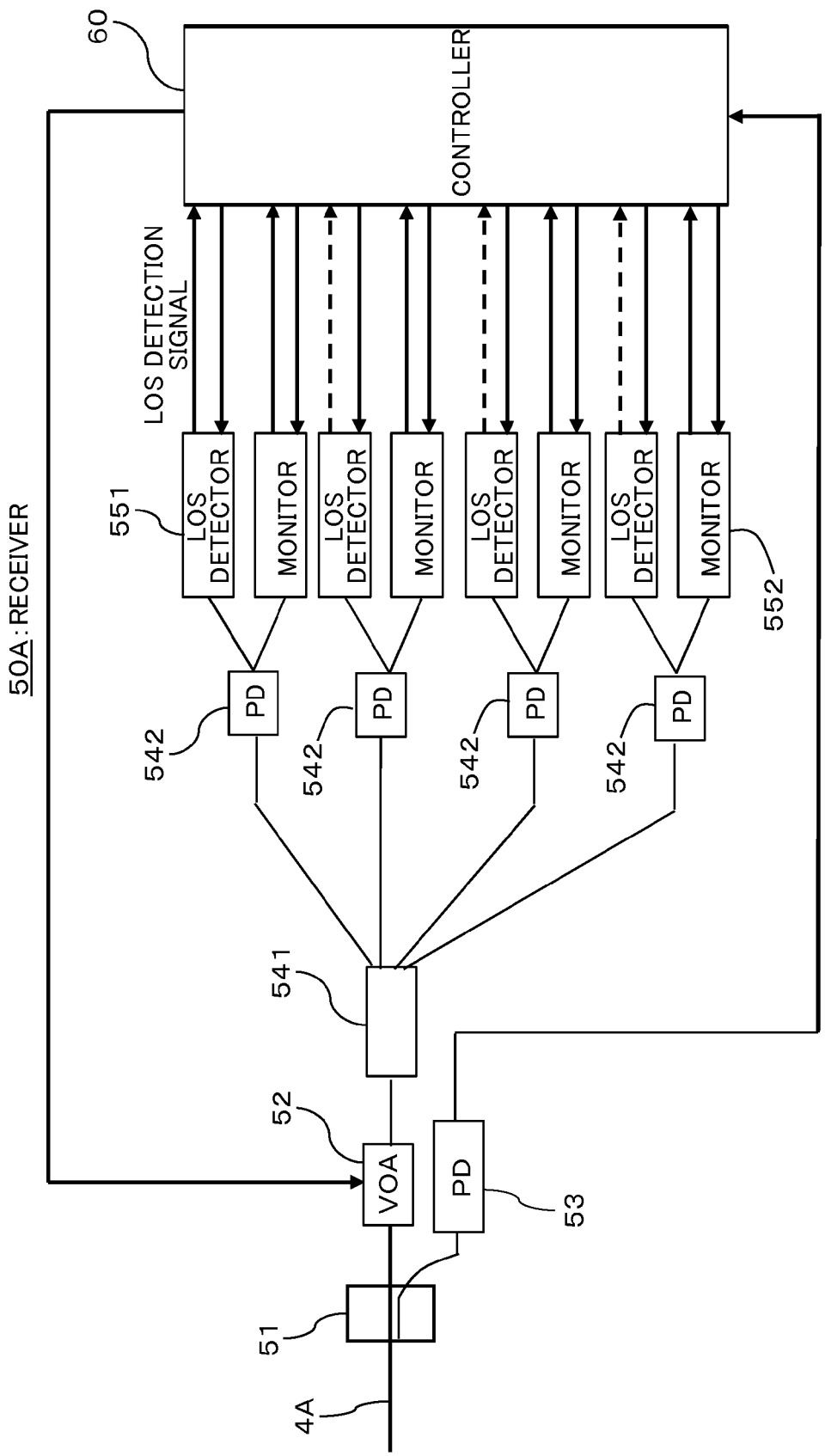
FIG. 9 is a block diagram illustrating an exemplary configuration of a receiver illustrated in FIGS. 1 and 3.

Next, FIG. 9 illustrates an exemplary configuration of the receiver 50A to achieve the above-mentioned VOA loss setting (or control). In FIG. 9, the components denoted by the same symbols described above indicate the components identical with or similar to those described above unless otherwise mentioned.

As illustrated in FIG. 9, the receiver 50A may include a LOS detector 551 and a monitor 552 at the output side of each PD 542 for each wavelength (or lane). Further, each of the LOS detector 551 and the monitor 552 is connected to a controller 60.

The controller 60 may be built in the receiver 50A or may be provided in the outside of the receiver 50A. A block containing the LOS detector 551 and the controller 60, or a block containing the LOS detector 551, the monitor 552, and the controller 60 is an example of a control apparatus of the receiver 50A which is an example of the optical reception apparatus.

The LOS detector 551 compares an output voltage of the PD 542 with the threshold voltage. In a case where the output voltage of the PD 542 is lower than the threshold voltage, the LOS detector 551 outputs a LOS detection signal to the controller 60.

Figure 10:
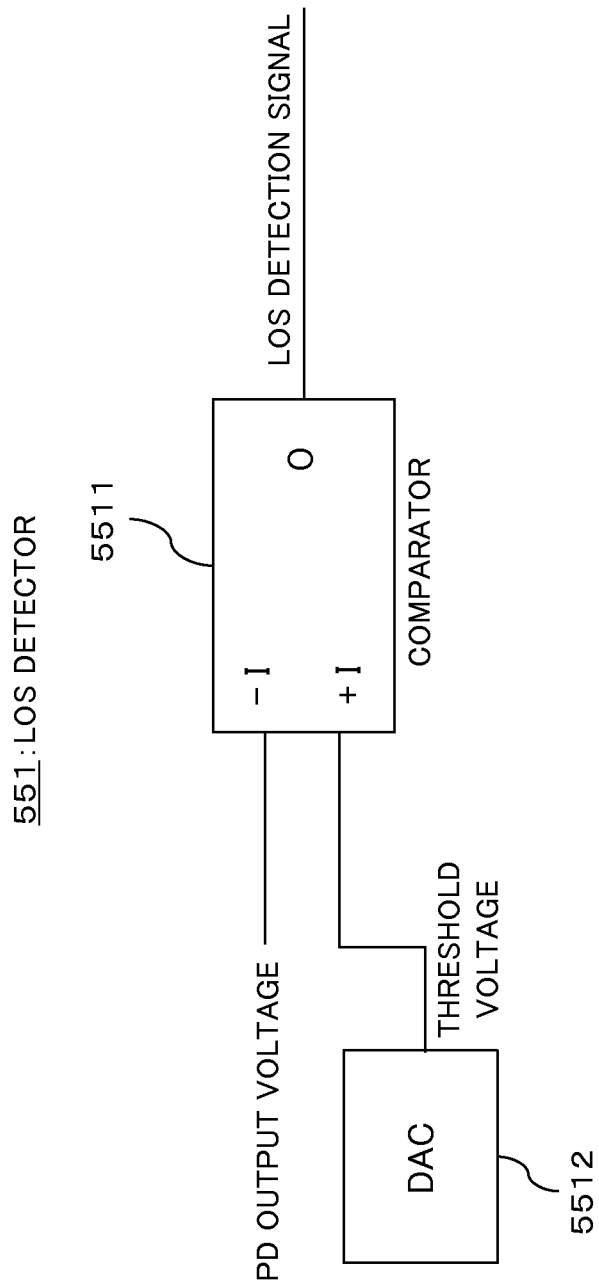
FIG. 10 is a block diagram illustrating an exemplary configuration of a LOS detector illustrated in FIG. 9.

Therefore, the LOS detector 551 may include, for example, a comparator 5511 and a digital-analog converter (DAC) 5512 as illustrated in FIG. 10.

The output voltage of the PD 542 is input to one of the input terminals (e.g., negative terminal) of the comparator 5511, and the threshold voltage from the DAC 5512 is input to the other of the input terminals (e.g., positive terminal). When the output voltage of the PD 542 is lower than the threshold voltage from the DAC 5512, the comparator 5511 outputs the LOS detection signal. The threshold voltage given from the DAC 5512 to the comparator 5511 may be set by the controller 60, for example.

Herein, the threshold voltage may be unnecessary to be set for each of the LOS asserted level and the LOS cancellation level. In other words, the threshold voltage may be common to both of the LOS asserted level and the LOS cancellation level. The reason is as follows. In the present embodiment, since the VOA loss is set to be a loss equivalent to the hysteresis during the light interruption state, the hysteresis between the LOS asserted level and the LOS cancellation level is not achieved by using an electric circuit (or an electrical signal level) but instead achieved by suing an optical circuit (or an optical signal level). Therefore, with focusing on the electrical signal level, the threshold voltage equivalent to the LOS asserted level may also be considered as the threshold voltage equivalent to the LOS cancellation level. The change of the threshold voltage may be considered as corresponding to that the hysteresis illustrated in FIG. 5 shifts along the horizontal axis (or the input optical power to the PD).

The monitor 552 is available to monitor the reception optical power of the PD 542 by monitoring the output voltage of the PD 542 and to output the monitoring result (hereinafter, may also be referred to as a "reception power monitoring value") to the controller 60.

The LOS detector 551 and the monitor 552 described above may be provided in, for example, the CDR circuit 55 illustrated in FIG. 3. In other words, the functions of the LOS detector 551 and the monitor 552 may be realized as a function of the CDR circuit 55.

The controller 60 controls the VOA loss of the VOA 52 based on the electrical signal (or WDM signal light power information) according to the power of the WDM signal light monitored by the monitor PD 53 and the output signals of the LOS detector 551 and the monitor 552 in each lane. The WDM signal light is input to the VOA and is monitored by the monitor PD 53.

For example, in a normal operation, the controller 60 controls the VOA loss such that the input optical power to the PD 542 does not exceed the damage level based on the WDM signal light power information from the monitor PD 53 and the reception power monitoring value of the monitor 552 in each lane.

Figure 11:
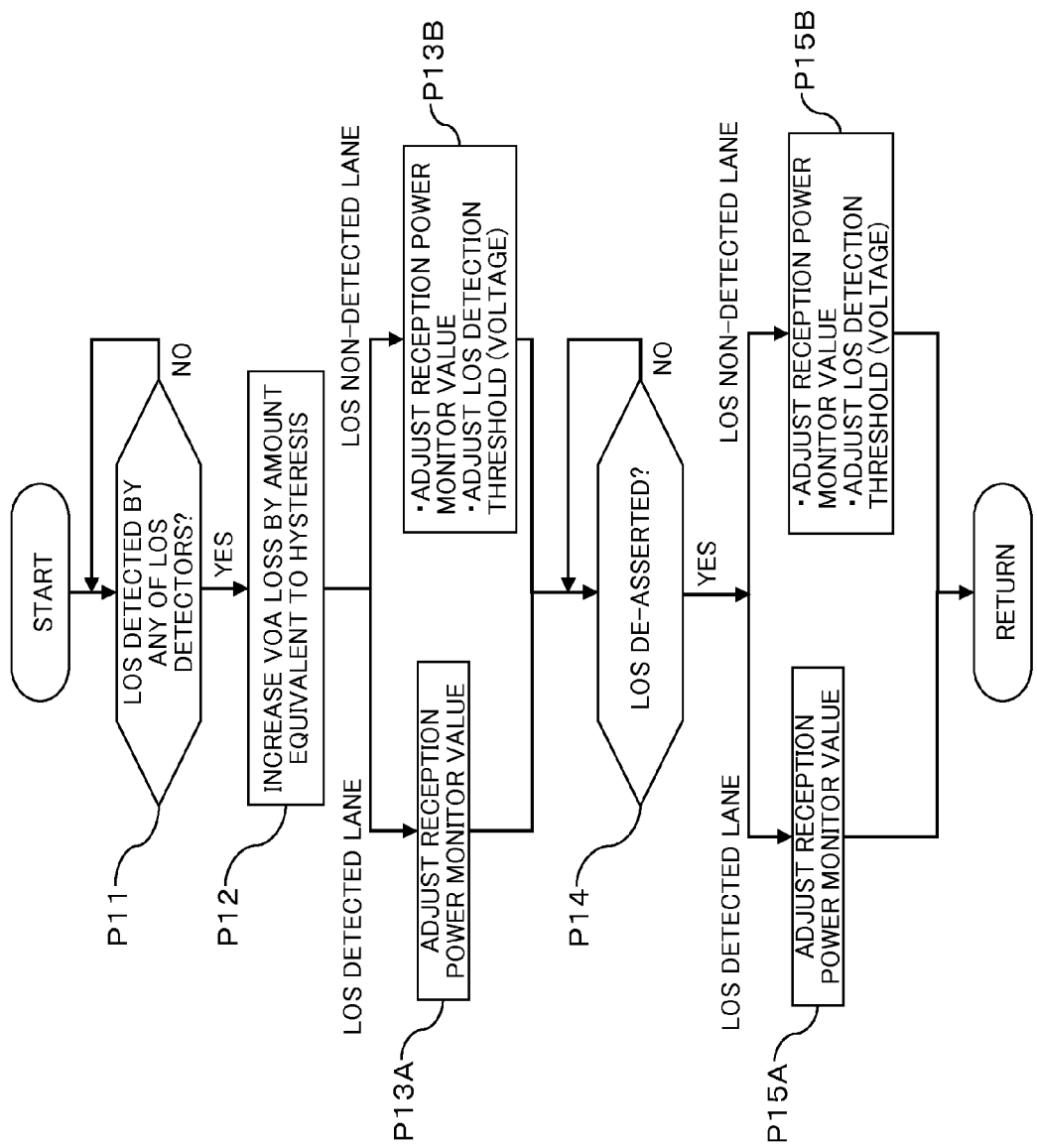
FIG. 11 is a flowchart for describing an operation of a controller illustrated in FIG. 9.

Then, as illustrated in FIG. 11, the controller 60 monitors, for example, whether the LOS detection signal is output from any of the LOS detectors 551 (NO route in Process P11). When the LOS detection signal is output from the LOS detector 551 in any of the lanes (a case of YES in Process P11), the controller 60 sets the VOA loss to a VOA loss equivalent to the aforementioned hysteresis (Process P12).

Herein, the LOS detection signal is output even in any of a case where the WDM signal light is not input to the VOA 52 and a case where only a part of the wavelengths included in the WDM signal light enters the light interruption state.

In other words, when the WDM signal light is not input to the VOA 52, the LOS detection signal is output from the LOS detector 551 in each lane. In contrast, when only a part of the wavelengths included in the WDM signal light enters the light interruption state, the LOS detection signal is output only from the LOS detector 551 of the corresponding lane. The lane through which the LOS detection signal is output from the LOS detector 551 may be referred to as the "LOS detected lane", and the other lane(s) may be referred to as the LOS non-detected lane(s).

Even in a case where the LOS detection signal(s) is output only from a part of the LOS detector(s) 551 of the corresponding lane(s), the controller 60 may perform the setting of the VOA loss equivalent to the hysteresis on the VOA 52. Therefore, the input optical power to the PD 542 in the LOS non-detected lanes is reduced according to the VOA loss setting. When an output voltage value of the PD 542 is lower than the threshold voltage due to the power reduction, the LOS detection signal may be erroneously output by the LOS detector 551 corresponding to the LOS non-detected lane.

In order to prevent the erroneous detection, the controller 60 may adjust (or correct), for example, the threshold voltage given from the DAC 5512 to the comparator 5511 in the LOS detector 551 corresponding to the LOS non-detected lane (Process P13B).

For example, the controller 60 may lower the threshold voltage to a voltage within a range satisfying that the LOS detection signal is not erroneously detected due to the VOA loss setting equivalent to the hysteresis and the minimum reception sensitivity of the PD 542. The adjustment of the threshold voltage may be performed, for example, based on the reception power monitoring value of the monitor 552 corresponding to the LOS non-detected lane.

Further, the reception power monitoring value detected by the monitor 552 corresponding to a wavelength not in the light interruption state (or the LOS non-detected lane) is also deviated (or reduced) from the reception power monitoring value to be originally detected due to the setting of the VOA loss equivalent to the hysteresis.

Therefore, the controller 60 may adjust (for example, increase) the reception power monitoring value detected by the monitor 552 corresponding to the LOS non-detected lane to be the value to be originally detected according to the setting of the VOA loss equivalent to the hysteresis (Process P13A). The adjustment of the reception power monitoring value may be applied to the monitor 552 corresponding to the lane through which the LOS detection signal is output (Process P13B).

Thereby, the controller 60 is possible to control the VOA loss based on, for example, the adjusted reception power monitoring value and the WDM signal light power information from the monitor PD 53 so that the VOA loss transitions in an appropriate range where the input optical power to the PD 542 of the LOS non-detected lane does not exceed the damage level.

Thereafter, the controller 60 monitors whether the output of the LOS detection signal is stopped (or cancelled) (NO route in Process P14). In response to a detection of the cancellation of the LOS detection signal (a case of YES in Process P14), the controller 60 may control the adjusted reception power monitoring value and the adjusted threshold voltage back to the pre-adjusted values (Processes P15A and P15B). Subsequently, the process of the controller 60 returns to Process P11, and the controller 60 may monitor whether another LOS detection signal is output from any of the LOS detectors 551.

Figure 12:
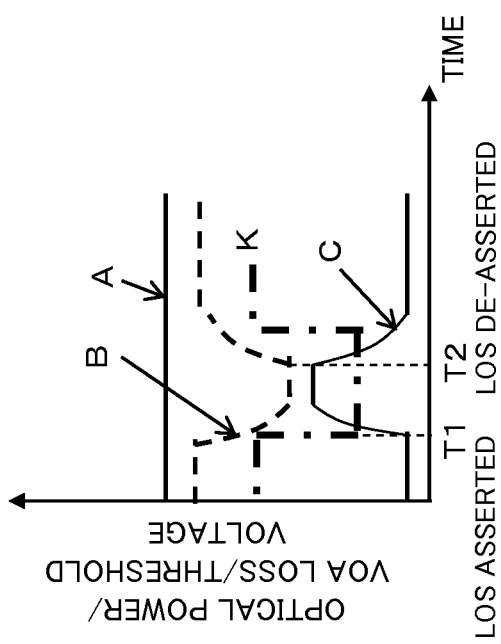
FIG. 12 is a diagram illustrating an example of temporal changes in the input optical power to the VOA, the input optical power to the PD, the VOA loss, and the LOS asserted level (a threshold voltage) with respect to a LOS undetected lane of the receiver illustrated in FIG. 9.

FIG. 12 illustrates an example of the temporal changes of the input optical power to the LOS non-detected lane, the input optical power to the PD 542, the VOA loss, and the threshold voltage, focusing on the LOS non-detected lane. In FIG. 12, the solid line A depicted on the uppermost portion indicates the change in the input optical power to the LOS non-detected lane, the dotted line B indicates the change in the input optical power to the PD 542, the solid line C indicates the change in the VOA loss, and the chain line K indicates the temporal change in the threshold voltage.

As illustrated in FIG. 12, when the LOS detection signal is output from the LOS detected lane at the time T1, the VOA loss is controlled to be increased up to an amount equivalent to the hysteresis, and the threshold voltage of the LOS detector 551 (or the comparator 5511) in the LOS non-detected lane is controlled (or adjusted) to be lowered. Thereafter, when the output of the LOS detection signal is stopped at the time T2, the adjusted threshold voltage is controlled back to the pre-adjusted threshold voltage (or controlled to be increased). A timing point of controlling the threshold voltage back to the pre-adjusted threshold voltage may be a timing point (e.g., the time T2) at which the output of the LOS detection signal is stopped, or may be a timing point after a predetermined period of time elapses from the time T2.

The above-mentioned embodiment explains about an example in which the VOA loss is set (or increased) to be a loss equivalent to the hysteresis when the light interruption state is detected. However, the present embodiment is not limited thereto. For example, the VOA loss may be set to be a loss beyond an amount equivalent to the hysteresis. The setting of the VOA loss beyond an amount equivalent to the hysteresis may be allowed as long as the input optical power to the PD 542 at the time of recovering of the input light does not exceed the damage level and the VOA loss making the input optical power to the PD 542 available to reach the LOS cancellation level within the LOS cancellation time defined in the CFP standard.

For example, in order to protect the PD 542 from damage, the VOA 52 may be set to have the VOA loss beyond an amount equivalent to the hysteresis on demand (see the solid line C of (2) of FIG. 13). Herein, upon setting the VOA loss beyond the amount equivalent to the hysteresis, a PD output voltage input to the LOS detector 551 (or the comparator 5511) becomes hard to exceed the threshold voltage. Therefore, the LOS detection signal becomes hard to be cancelled.

Such difficulty in cancelling the LOS detection signal may be considered as that the LOS cancellation level illustrated in FIG. 5 comes close to the LOS asserted level and thus the hysteresis amount is substantially reduced. Accordingly, the VOA loss equivalent to the hysteresis may be unsecured.

Therefore, as exemplarily illustrated in FIG. 13, the controller 60 may perform control to lower the threshold voltage of the comparator 5511 according to the ensured amount of the loss beyond the amount equivalent to hysteresis. In (3) of FIG. 13, the dotted line B indicates the temporal change in the input optical power (in other words, the PD output voltage) to the PD 542, and the chain line K indicates the temporal change in the threshold voltage. Further, (1) of FIG. 13 illustrates an example of a relation between the temporal change in the input optical power to the VOA 52 (see the solid line A) and the temporal change in the VOA loss (see the dotted line C).

When the VOA loss beyond the amount equivalent to the hysteresis is set as illustrated in (2) of FIG. 13, by lowering the threshold voltage as depicted by the chain line K in (3) of FIG. 13, the VOA loss equivalent to the hysteresis can be ensured as depicted by the dotted line C in (1) of FIG. 13.

The above-mentioned embodiment explains about the case where the light received by the receiver 30 (50A) (in other words, the light input to the VOA 52) is the WDM signal light. However, the above-mentioned control on the VOA loss may be applied to a case where the light includes a single wavelength. Therefore, even when the reception light is the single wavelength light, it is possible to achieve compatibility between the protection for the PD 542 against damage and the suppression of the delay in the LOS cancellation time.

Further, the above-mentioned embodiment explains about that the erroneous assertion of the LOS detection signal is prevented by adjusting the LOS asserted level (or the threshold voltage of the comparator 5511) of the LOS detector 551 in the LOS non-detected lane; however, the present embodiment is not limited thereto. For example, the controller 60 may adjust (or increase), according to the VOA loss, a voltage (or the PD output voltage) dependent to the power of the reception light input to the LOS detector 551 from the PD 542 Such adjustment also makes possible to prevent the erroneous assertion of the LOS detection signal in the LOS non-detected lane. For example, the adjustment of the PD output voltage is achievable by providing an amplifier having a variable amplification gain between the PD 542 and the comparator 5511 and by controlling the amplification gain by the controller 60.

According to the above-mentioned technology, it is possible to achieve compatibility between protecting an optical component such as a light receiving element from being damaged and suppressing a delay in time taken until the light interruption state is cancelled.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical reception apparatus comprising:
   a variable optical attenuator configured to adjust a loss of an output optical power of a received light;
   a detector configured to detect that the output optical power is equal to or lower than a loss of signal (LOS) asserted level, the LOS asserted level being used to determine whether the output optical power is in a light interruption state and to assert a LOS alarm; and a controller configured to increase the loss of the variable optical attenuator to a first loss according to a LOS de-asserted level, the LOS de-asserted level being used to determine whether the light interruption state is recovered and to de-assert the LOS alarm, upon detecting by the detector that the output optical power is equal to or lower than the LOS asserted level.

2. The optical reception apparatus according to claim 1, wherein
the first loss is within a range that enables the output optical power to reach the LOS de-asserted level within a predetermined time in response to an increase of the output optical power while preventing the variable optical attenuator to input an output light power beyond the maximum reception level of an optical receiver to the optical receiver, the optical receiver receiving the output light of the variable optical attenuator.

3. The optical reception apparatus according to claim 2, wherein
the first loss corresponds to a difference between the LOS asserted level and the LOS de-asserted level.

4. The optical reception apparatus according to claim 1, wherein
the received light is a wavelength-multiplex light in which a plurality of wavelengths are multiplexed,
the optical reception apparatus comprises a plurality of detectors corresponding to the plurality of wavelengths, and
the controller is configured to control, when any of the detectors detects that the output optical power is equal to or lower than the LOS asserted level, the LOS asserted level with respect to the other detectors not detecting that the output optical power is equal to or lower than the LOS asserted level such that the LOS asserted level is decreased according to the increase of the loss.

5. The optical reception apparatus according to claim 1, wherein
the controller is configured to control, upon setting a second loss beyond a loss corresponding to a difference between the LOS asserted level and the LOS de-asserted level as the first loss, the LOS de-asserted level to be decreased according to the second loss.

6. A control apparatus of an optical reception apparatus that comprises a variable optical attenuator to adjust a loss of an output optical power of a received light, the control apparatus comprising:
a detector configured to detect that the output optical power is equal to or lower than a loss of signal (LOS) asserted level, the LOS asserted level being used to determine whether the output optical power is in a light interruption state and to assert a LOS alarm; and
a controller configured to increase the loss of the variable optical attenuator to a loss according to a LOS de-asserted level, the LOS de-asserted level being used to determine whether the light interruption state is recovered and to de-assert the LOS alarm, upon detecting by the detector that the output optical power is equal to or lower than the LOS asserted level.

7. A control method of an optical reception apparatus that comprises a variable optical attenuator to adjust a loss of an output optical power of a received light, the control method comprising:
detecting by a detector that the output optical power is equal to or lower than a loss of signal (LOS) asserted level, the LOS asserted level being used to determine whether the output optical power is in a light interruption state and to assert a LOS alarm; and
in response to the detection made by the detector, increasing the loss of the variable optical attenuator to a loss according to a LOS de-asserted level, the LOS de-asserted level being used to determine whether the light interruption state is recovered and to de-assert the LOS alarm.

* * * * *